2,937,207

PROCESS FOR THE MANUFACTURE OF QUATERNARY ORGANIC PHOSPHORUS COMPOUNDS

Martin Reuter and Ludwig Orthner, Frankfurt am Main, Franz Jakob, Hofheim (Taunus), and Erhard Wolf, Frankfurt am Main, Germany, assignors to Farbwerke Hoechst Aktiengesellschaft vormals Meister Lucius & Bruning, Frankfurt am Main, Germany, a corporation of Germany No Drawing. Application January 28, 1958
Serial No. 711,567

Claims priority, application Germany January 30, 1957

4 Claims. (Cl. 260—606.5)

Copending application Serial No. 708,764, filed January 14, 1958, describes a process for the manufacture of an organic phosphorus compound of the hitherto unknown tri-hydroxy-methyl-phosphine, which consists in reacting ¼ mol of phosphine with 1 mol of formaldehyde preferably in the presence of water, in the presence of small quantities of finely distributed metals that do not belong to the alkali metals or alkaline earth metals and/or their compounds which can react with phosphine, and/or their phosphine reaction products.

It has now been found that this new accessible tri-hydroxy-methyl-phopshine can be converted into new quaternary organic phosphorus compounds by reaction with agents showing a quaternizing effect, although, in contrast to other comparable phophorus bases, for example, $P(C_2H_5)_3$ which in its chemical character is closely related to tertiary amines, it shows in water a slightly acid reaction (pH 6.5) and therewith proves not to be a base.

The reaction products obtained according to the process of the present invention probably contain, in addition to three original hydroxy-methyl-groups in the phosphonium ion, the organic residue of the quaternizing agent bound directly to phosphorus.

Quaternizing agents, which can also carry other, non quaternizing groups, are for example: alkyl halides, particularly those having up to 12 carbon atoms and up to 2 halogen atoms one of which is bound to a terminal carbon atom, and aralkylhalides, particularly lower aralkylhalides having a halogen atom on the terminal carbon atom of the side chain, such as methyl chloride, methyl iodide, ethyl bromide, pentyl iodide, ethylene bromide, benzylchloride; furthermore, benzoic acid-methyl-ester, lower alkyl esters of p-toluene sulfonic acid, such as p-toluene-sulfonic acid-methyl or butylester, lower dialkyl sulfates, such as dimethylsulfate and chloracetamide.

It is also possible to quaternize tri-hydroxy-methyl-phosphine with aldehydes, preferably in the presence of water or, if desired, in the presence of acids.

The reaction products of the present invention probably contain, in addition to the original hydroxy-methyl groups in the phosphonium ion, the introduced aldehyde in carbon-phosphorus linkage with formation of an hydroxy group in α-position; in the form of an anion there is present either an acid residue or—in case the reaction is carried out in the absence of acids—the hydroxyl group.

Suitable aldehydes are, for example, aliphatic, saturated or unsaturated aldehydes especially such as formaldehyde, either as monomers or in their polymeric form. Other aldehydes, particularly aliphatic mono- and di-aldehydes having 2 to 5 carbon atoms are also useful, such as acetaldehyde, acrolein, croton aldehyde, glyoxal, and chloracetaldehyde. Aromatic aldehydes such as benzaldehyde, p-chlorobenzaldehyde, furthermore hetero-cyclic aldehydes as, for example, furfural, can be used. There may also be used mixtures of aldehydes; in circumstances, the aldehydes may be used at a higher molar proportion in relation to the used tri-hydroxy-methyl-phosphine.

Furthermore, tri-hydroxy-methyl-phosphine can also be converted into quaternary organic phosphorus compounds by reaction with alkylene-oxides, if desired in the presence of water and/or organic water-miscible solvents and/or of acids.

The reaction products thus obtained probably contain, in addition to the original hydroxymethyl groups in the phosphonium ion, the introduced alkylene-oxide in carbon-phosphorus linkage with formation of a hyroxy-group in β-position; as anion there is present either an acid group or—in case the reaction has been carried out in absolute absence of acid—the hydroxyl group.

As alkyleneoxides which are suitable for a reaction of this kind according to the invention, there come into consideration saturated lower aliphatic epoxide compounds having up to 2 epoxy rings and 2 to 4 carbon atoms, such as: ethylene-oxide, epi-chloro-hydrin, glycide, propylene-oxide, and butadiene dioxide. Other epoxy compounds can be used, such as styrene-oxide, furthermore polyepoxides, as, for example, tri-glycide-cyanurate. There may also be used mixtures of alkylene-oxides; the alkylene oxides may even be used at higher molar proportions in relation to the tri-hydroxy-methyl-phosphine used.

Another possibility of converting tri-hydroxymethyl-phosphine into quaternary, organic phosphonium compounds is to react it with aliphatic α,β-unsaturated carboxylic acids, -esters or -amides, if desired, in the presence of water and/or of water-miscible organic solvents and/or of acids.

The reaction products obtained in this manner probably contain in addition to the original hydroxy-methyl groups in the phosphonium ion, the introduced vinyl compound in carbon-phosphorus linkage in the form of a now saturated organic group; as anion there is present either an acid group or—in case the reaction has been carried out in absolute absence of acids—the hydroxyl group. If α,β-unsaturated carboxylic acids themselves are used, there probably are obtained phosphonium-betaines.

Suitable aliphatic, α,β-unsaturated carboxylic acids or -esters, or -amides are, for example, acrylic acid, crotonic acid, acrylamide, acrylic acid-methylamide, acrylic acid-anilide, methylether of the acrylic acid-methylol-amide, methacrylic acid-methyl-ester, acrylic acid-methyl-ester, acrylic acid-butylester, acrylic acid-dodecyl-ester, acrylic acid-phenyl-ester, acrylic acid-p-nitrophenyl-ester, crotonic acid amide, triacrylamide-formal. There may also be used mixtures of the mentioned compounds; they may also be used at higher molar proportions in relation to the used tri-hydroxymethyl-phopshine.

As acids there come into consideration inorganic acids, such as hydrohalic acids, for example hydrochloric acid, sulfuric acid, as well as organic acids, such as acetic acid, benzoic acid, oxalic acid, benezene sulfinic acid, benzene sulfonic acid, cyclohexane-phosphonic acid.

In general, the reaction takes place with a more or less high heat effect; in the first case it is advantageous to operate with cooling at approximately room temperature or with addition of inert diluents or solvents such as water, low molecular weight alcohols and ketones. At a moderate heat effect, it is possible to operate without diluents, or with solvents with a high dielectric constant, such as dimethyl-formamide and acetronitrile. In order to complete the reaction. it may be useful to heat the components at an average temperature of about 50 to 100° C.

The process according to the present invention permits a multiple variation of the 4th carbon group in the phosphonium ion and in the anion and thus permits a very favorable adaptation of the properties of the compounds to the requirements of use.

The reaction products, which are colorless or slightly yellow, are, according to the choice of the components, oily, wax-like or crystalline substances, which are easily soluble in water and low molecular weight alcohols, but sparingly soluble in hydrocarbons. The phosphonium hydroxides that can be prepared according to the process show a slight to moderate alkaline reaction; the phosphonium salts and phosphonium-betaines show—according to the acidity of the acids and the character of the alkylation agents of the aldehyde, of the alkylene-oxide or of the vinyl compound—a neutral to moderately acid reaction.

The reaction products obtained according to the process of the invention can be industrially used as flame-proofing agents for textiles and wood, and as insecticides.

The following examples serve to illustrate the invention but they are not intended to limit it thereto; the parts being by weight.

*Example 1*

124 grams of tri-hydroxymethyl-phosphine (1 mol) are dissolved, with exclusion of air, in 124 parts of methanol or 370 parts of isopropanol, and to this solution are added dropwise at a temperature of about 20° C., while stirring and cooling, 142 parts of methyliodide (1 mol). The formation of the tri-hydroxymethyl-monomethyl-phosphonium-iodide sets in immediately with spontaneous heating. From the clear reaction solution, the iodide can be obtained in very good yield either by precipitation with di-ethyl-ether or by evaporation of the solvent. It is a viscous oil, which is easily soluble in water while showing a slightly acid reaction. The analytic structure corresponds to the formula $[(HOCH_2)_3PCH_3]I$ showing that all the iodine is linked in ionogenic form.

If there are used 126 grams of benzyl-chloride (1 mol) instead of the methyl iodide and if the operation is performed in the same manner, there is obtained in a very good yield the tri-hydroxy-methylbenzyl-phosphonium chloride in the form of a viscous oil which is soluble in warm water while producing a slightly acid reaction, and whose analytic content of ionogenic chlorine corresponds to the theory; the compound is easily soluble in low molecular weight alcohols, but sparingly soluble in benzene and ether.

*Example 2*

124 grams of tri-hydroxy-methyl-phosphine are introduced, while stirring, with exclusion of air into a solution of 94 grams of chloro-acetamide in 500 ccm. of warm methanol. The clear solution is heated for some hours under reflux, and the solvent is then distilled off. There are obtained 210 grams of a colorless oil, which solidifies at 10° C. The oil is easily soluble in water while producing a slightly acid reaction. It is insoluble in alcohol and ether, but soluble in warm methanol, and has the analytical structure $[(HOCH_2)_3(CH_2CONH_2)P]Cl$, all chlorine being linked in ionogenic form.

*Example 3*

9.2 grams of epi-chlorohydrin are added at room temperature and in a nitrogen atmosphere, while stirring continuously, to 24.8 grams of tri-hydroxy-methyl-phosphine. The reaction mixture slowly develops heat and is maintained at a temperature of between 25–30° C. by intense cooling. After a period of about 30 minutes, the main reaction is completed. The pulpy reaction mixture is subsequently heated for 4 hours to 70–80° C., whereby quaternization is completed. The chlorine, which was bound before in homopolar form, is now quantitatively present in form of ionogenic chlorine.

The colorless, oily reaction product is easily soluble in water (pH value of the aqueous solution=8) and in dimethyl-formamide, but it is sparingly soluble in other organic solvents.

*Example 4*

124 grams of tri-hydroxy-methyl-phosphine (1 mol) and 160 grams of ethylene-chlorohydrin (2 mols) are heated to a temperature of 100° C., while stirring, with exclusion of air, whereby quaternization in the clear melt occurs with spontaneous heating. The temperature of the reaction mixture is maintained at about 105° C. by external cooling. The whole is again stirred for 2 hours at 110° C., and then the excess ethylene-chlorhydrin is distilled off under reduced pressure, 80 grams thereof (1 mol) being recovered. There remain, in form of a distillation residue, 200 grams of colorless, thick oily tri-hydroxy-methyl-phosphonium-chloride which is very easily soluble in water, methanol and ethanol while showing a slightly acid reaction; it is insoluble in ether. It contains already in crude state 16% of ionogenic chlorine (theory=17.4); no trivalent phosphorus can be identified by hydrochloric titration with an iodine solution, which demonstrates the complete quaternization of the tri-hydroxy-methyl-phosphine.

*Example 5*

49.6 grams of tri-hydroxy-methyl-phosphine (0.4 mol) are heated to 90° C. in an atmosphere of nitrogen in 75 ml. of n-butanol with 37.5 grams of ethylene-bromide (0.2 mol). The quaternization is effected in an exothermic reaction, during which the solution becomes turbid, and the reaction product is obtained in good yield in the form of oil. The temperature is maintained between 90–95° C. by cooling from outside. After completion of the reaction the solvent is decanted off, the oil stirred with 75 ml. of n-butanol, the alcohol again decanted off and the operation repeated twice with 50 ml. of ether. After drying over concentrated sulfuric acid, there is obtained 1,2-ethane-di-(tri-hydroxymethyl-phosphonium)-dibromide in the form of a colorless oil which is very easily soluble in water (pH value of the aqueous solution=3) and methanol (but is only sparingly soluble in organic solvents such as benzene, acetic ester, acetone, chloroform and ether.

When heating 1 mol of 1,3-dibromopropane and 2 mols of tri-hydroxy-methyl-phosphine in 10 mol methanol, there is obtained in good yield by precipitation with ethanol the 1,3 propane-di-(trihydroxy-methyl-phosphonium)-dibromide, which, after recrystallization from methanol, has a melting point of 107–108° C. The compound is very easily soluble in water (pH value of the aqueous solution=4), but sparingly soluble in organic solvents.

If 1 mol of 1,1'-dichloro-dimethyl-ether is added dropwise to 2 mols of trihydroxy-methyl-phosphine with intense cooling, the analogous oily bis-phosphonium-chloride is formed which is very soluble in water, but sparingly soluble in organic solvents.

*Example 6*

To 124 grams of tri-hydroxy-methyl-phosphine are added dropwise, while stirring, with exclusion of air, in an atmosphere of nitrogen, at a temperature of 45–50° C., 126 grams of dimethyl-sulfate, and the mixture is stirred for some hours at 50° C. The reaction heat is dissipated by cooling from outside. The tri-(hydroxy-methyl)-methyl-phosphonium-methylsulfonate that has formed is a viscous colorless oil which is easily soluble in water (pH value of the aqueous solution=3.5) and methanol, but is insoluble in ether.

If, instead of dimethylsulfate, the equivalent quantity of p-toluene-sulfonic acid-methylester is used, there is obtained in similar manner the solid tri-(hydroxy-methyl)-methyl - phosphonium - toluene - sulfonate (melting point 80° C.) with equal solubility properties. It can be ob-

Example 7

30 ml. of n-butanol 12.4 grams of tri-hydroxy-methyl-phosphine (0.1 mol) and 24.9 grams of n-dodecylbromide (0.1 mol) are heated for 1 hour to 120° C. in an atmosphere of nitrogen, whereby quaternization is effected. The clear solution of the tri-hydroxy-methyl-dodecyl-phosphonium-bromide is concentrated in a vacuum. The compound thus obtained in quantitative yield is a wax-like, colorless substance (melting point 39° C.), which is very easily soluble in alcohols, benzene, ether, carbon tetrachloride, dioxane and acetone, but sparingly soluble in benzine. The bromide is easily dissolved in hot water, whereas it is only sparingly soluble in cold water (pH value of the aqueous solution 4.8); thereby colloidal foam producing solutions are formed.

Example 8

To a solution of 24.8 grams (0.2 mol) of tri-hydroxy-methyl-phosphine in 50 cc of absolute alcohol are added slowly and dropwise, while stirring, at a temperature of 50° C. in an atmosphere of nitrogen and in the presence of 0.4 gram of hydroquinone, 15.3 grams (0.2 mol) of allyl-chloride dissolved in 25 cc of absolute alcohol. After 3 hours there are added dropwise 3 grams (0.02 mol) of allyl-chloride. The reaction solution is maintained for 3 hours under reflux at the same temperature. After separation of the allylchloride and alcohol by distillation under reduced pressure at 60° C., there remains a colorless water-soluble and alcohol-soluble oil, which according to analysis, after boiling out the hydroquinone by means of acetone, constitutes the tri-hydroxy-methyl-allyl-phosphonium-chloride, which spontaneously adds bromine, because of its double linkage. The reaction is also successfully carried out in an aqueous medium or in the melt, as well as in the absence of hydroquinone.

Example 9

12.4 grams of tri-hydroxymethyl-phosphine (0.1 mol), 24.5 grams of β-bromo-ethane-phosphoric acid-diethyl-ester (0.1 mol) and 30 grams of n-butanol are heated for approximately 2 hours to 80–90° C. in an atmosphere of nitrogen, whereby quaternization is produced; the reaction product contains the total quantity of bromine bound in ionogenic form. After separation of the solvent by distillation there remains the phosphonium salt in form of a colorless oil which is easily soluble in water (pH value of the aqueous solution=4) and alcohol, but which is difficultly soluble in ether, chloroform, benzene, carbon tetrachloride and acetic ester. It solidifies after prolonged standing (melting point 60–62° C.).

Example 10

To 24.8 grams of tri-hydroxy-methyl-phosphine are added at a temperature of 80° C. in an atmosphere of nitrogen and while stirring, 9.2 grams (in several portions) of epichlorhydrin. The temperature of the reaction mixture is maintained at 80° C. by cooling. The reaction, during which essentially 1 mol of tri-hydroxy-methyl-phosphine is quaternized by opening of the oxido-ring in the epichlorhydrin, has subsided after about 45 minutes. The oily reaction mixture is then heated for 4 hours to 80° C. whereby the total chlorine of the epichlorhydrin is converted into the state of ionogenic linkage. The clear, viscous bi-phosphonium-chloride is soluble in water (pH value of the aqueous solution of approximately 20% strength=approx. 8), but sparingly soluble in hot methanol; it is insoluble in other organic solvents such as chloroform, acetic ester, acetone and benzene. In this compound one of the two phosphorus atoms shows such a basic character that a bi-chloride can be prepared:

For conversion into a bi-chloride, 0.1 mol of hydrochloric acid of 20% strength is added to the above mentioned oil, whereby a colorless solution of a moderately acid reaction is formed accompanied by heating to about 45° C. After concentration in a vacuum, there are obtained 38 grams of a viscous oil which is dissolved for purification in 10 ml. of water, and slowly precipitated with ethanol. After drying at room temperature in a vacuum there is obtained bi-phosphonium-dichloride, probably of the following structure $(HOCH_2)_3P(Cl)CH_2—CH(OH)CH_2(Cl)P(CH_2OH)_3$ in an analytically pure form as strongly hygroscopic, colorless, very viscous oil, which is very easily soluble in water, sparingly soluble in hot methanol and difficultly soluble in other organic solvents.

Example 11

To a solution of 2.48 grams (0.02 mol) of tri-hydroxy-methyl-phosphine in 25 cc. of absolute alcohol or n-butanol there is added slowly and dropwise in an atmosphere of pure nitrogen, and at a temperature of 75° C., a solution of 3.91 grams (0.02 mol) of $(ClCH_2)_3P=O$ in 25 cc. of absolute alcohol. After a further boiling for 2 hours the reaction mixture is evaporated to dryness in a vacuum. There are obtained 6 grams of a colorless oil which is soluble in water (pH value of the aqueous solution=2.5) and alcohol, but insoluble in ether, and which after purification with isopropanol contains one chlorine atom linked ionogenically. It is an addition product of the tri-chloro-methyl-phosphine-oxide to tri-hydroxy-methyl-phosphine, and probably has the structure of a (di-chloromethyl-phosphinoxydomethyl)-tri-hydroxymethyl-phosphonium-chloride.

Example 12

To a solution of 12.2 grams (0.046 mol) of $(ClCH_2)_4PCl$ in 50 cc. of n-butanol heated to boiling there is added dropwise, in an atmosphere of pure nitrogen, within 15 minutes a solution of 5.7 grams (0.046 mol) of tri-hydroxy-methyl-phosphine in 50 cc. of n-butanol. After boiling for two to eight hours, there is obtained a mono-quaternization product of $(ClCH_2)_4PCl$ and $(HOCH_2)_3P$, in which a halogen atom is bound ionogenically. By distilling off the butanol under reduced pressure, there is obtained the colorless oily phosphonium compound, which is soluble in alcohol and water (pH value of the aqueous solution=4) but insoluble in ether.

Example 13

To a solution of 25 grams (⅕ mol) of tri-hydroxy-methylphosphine in 50 grams of methanol there are added dropwise at about 20° C., while stirring and cooling, 54 grams (⅕ mol) of methylene iodide. In an exothermic reaction a clear solution is formed, probably constituting tri-hydroxy-methyl-iodomethyl-phosphonium-iodide, which can be isolated in a vacuum in form of a viscous oil solidifying in the cold, by distilling off methanol. The compound is sparingly soluble in water and ether, easily soluble in methanol and alcohol and contains, as is shown by the analysis, at each phosphorus atom an ionogenically bound iodine atom. When the reaction product is heated to 80° C., while stirring, with another 25 grams of tri-hydroxy methyl-phosphine, there is obtained with exothermic reaction a viscous, wax-like oil solidifying in the cold, which probably is methylene-bis-(tri-hydroxy-methyl-phosphonium-iodide). This compound is easily soluble in water and methanol, but insoluble in ether, and contains for each phosphorus atom an iodine atom bound ionogenically.

Example 14

124 grams of tri-hydroxy-methyl-phosphine (1 mol) are stirred, under exclusion of air, with 100 grams of formalin of 30% strength (1 mol), whereby a clear solution is formed without essential development of heat while the pH value rises from 7 to about 8.5. If the reaction solution is concentrated by evaporation under reduced pressure at about 30° C., there is obtained in very good yield an oil which is easily soluble in alcohols, difficultly soluble in ethers and hydrocarbons, and which solidifies like wax at extremely low temperatures, and has the analytical structure of tetrahydroxymethyl-phosphonium-hydroxide. If, before concentration by evaporation, 1 mol of concentrated hydrochloric acid or 1 mol glacial acetic acid is added to the reaction solution, while cooling, there is obtained in good yield nearly pure tetrahydroxy-methyl-phosphonium-chloride (melting point 150° C.) or tetra-hydroxy-methyl-phosphonium-acetate (melting point 80° C.) respectively.

Example 15

To a solution of 124 grams of tri-hydroxy-methyl-phosphine in 200 grams of water there is added dropwise at about 20° C., under exclusion of air, while stirring and cooling, a solution of 70 grams (1 mol) of crotonaldehyde in 400 grams of water. The reaction sets in immediately with strong spontaneous heating, whereby the pH value of the solution rises from about 7 to about 10. The colorless reaction solution is concentrated by evaporation under reduced pressure, whereby the quaternary base is obtained in form of a colorless oil, which solidifies slowly in the cold. The base is easily soluble in low molecular weight alcohols, but insoluble in ether. Its acetate, prepared by neutralization of the aqueous solution with an equivalent of acetic acid and concentration by evaporation under reduced pressure, melts at 90° C. with evolution of gas, and is easily soluble in water (pH-value of the solution =6) and low molecular weight alcohols, but difficultly soluble in ether; the chloride prepared in analogous manner (melting point 88° C.) is easily soluble in water (pH about 4) and methanol, but insoluble in ether.

If, instead of crotonaldehyde an equivalent quantity of acrolein is used, and if operation is carried out in the same manner, there can be obtained with similar reaction the quaternary phosphonium base, likewise in form of a viscous colorless oil of equal solubility. Its acetate melts at 172° C., its chloride decomposes above 260° C.; both salts are very easily soluble in water, fairly soluble in methanol and difficultly soluble in ether.

Example 16

124 grams (1 mol) of tri-hydroxy-methyl-phosphine, 30 grams (1 mol) of para-formaldehyde and 45 grams (0.5 mol) of anhydrous oxalic acid are fused by heating to 80° C., while stirring, with exclusion of air. After 1 hour there is obtained a clear melt. It solidifies on cooling (solidification point about 75° C.), and renders in a very good yield, after a single recrystallisation from a little methanol, analytically pure tetra-hydroxymethylphosphonium-oxalate [(HOCH$_2$)$_4$P]$_2$(C$_2$O$_4$) melting at 96° C. and easily soluble in water while showing a slightly acid reaction.

Example 17

To 124 grams of tri-hydroxy-methyl-phosphine, dissolved in methanol of 50% strength, there are added dropwise, with exclusion of air and while stirring, 106 grams of benzaldehyde which dissolves completely with reaction; the pH value of the solution remains unchanged at 6.5. The solution is then concentrated by evaporation under reduced pressure, whereby a thick viscous, colorless oil is obtained in good yield. It is easily soluble in water and low molecular weight alcohols, but difficultly soluble in ether.

Example 18

If 1 mol of tri-hydroxy-methyl-phosphine is reacted in acordancce with the procedure described in Example 14 with 1 mol of acetaldehyde of 30% strength, and the weakly alkaline reaction solution is then neutralized with 1 mol of acetic acid, the acetate is obtained in solid form (melting point 89° C.) after separation by evaporation under reduced pressure; it is easily soluble in water (pH value of the solution =5) and low molecular weight alcohols, difficultly soluble in ether, and has the analytical composition $$(HOCH_2)_3(CH_3CHOH)P(CH_3CO_2)$$

The chloride prepared in an analogus manner is an oil which solidifies in the cold and is of equal solubility (pH value of the solution 3) and of the analytical structure (HOCH$_2$)$_3$(CH$_3$CHOH)PCl.

Examle 19

124 grams of tri-hydroxy-methyl-phosphine (1 mol) are mixed with 30 grams of paraformaldehyde for 1 hour with exclusion of air at a temperature of about 85° C., whereby 154 grams of a clear oil are formed which solidify in a wax-like manner in the cold. The oil is easily soluble in water (pH=8.8), as well as in methanol, isopropanol and dimethyl-formamide, it is insoluble in fat dissolvers such as ether and benzene. If reacted with 1 mol of glacial acetic acid or picrolonic acid in an aqueous or anhydrous methanolic solution, pure tetra-hydroxy-methyl-phosphonium-acetate (melting point 83° C.) or tetra-hydroxy-methyl-phosphonium-picrolonate (melting point 177° C.) respectively is obtained in nearly theoretical yield, in the same manner as tetra-hydroxy-methyl-phosphonium-hydroxide is obtained by treatment with aqueous formalin (Example 14). It is, therefore, assumed, that this reaction product of tri-hydroxy-methyl-phosphine and paraformaldehyde is a tetra-hydroxymethyl-phosphine in yield form, which easily adds water to the quaternary base.

The same compound is obtained by prolonged heating of 172 grams of tetra-hydroxy-methyl-phosphonium-hydroxide (Example 14) at about 50° C. in the vacuum, whereby 1 mol of water is split off.

The reaction of para-formaldehyde with tri-hydroxymethyl-phosphine described at the beginning, may also be carried out in the presence of 100 grams of anhydrous methanol or ethanol with heating under reflux.

Example 20

To a solution of 25 grams (⅕ mol) of tri-hydroxymethyl-phosphine in 25 grams of water there are added dropwise with exclusion of air, while stirring, 5.8 grams (¹⁄₁₀ mol) of glyoxal dissolved in 23 grams of water. Since the reaction takes an exothermic course, it is necessary to maintain the temperature of the reaction mixture at about 30° C. by external cooling. The pH value of the reaction solution rises to 8.5 already after addition of the first portions of glyoxal. To this solution of glyoxal-bis-(tri-hydroxymethyl-phosphonium)-hydroxide are then added dropwise, while cooling from outside, 12 grams (⅕ mol) of glacial acetic acid, causing the pH value of the mixture to fall to 4.8. By concentration of the clear reaction solution under reduced pressure there is obtained anhydrous glyoxal-bis-(tri-hydroxymethyl-phosphonium)-acetate in the form of a viscous oil. The compound is easily soluble in methanol, but insoluble in ethanol and ether.

If instead of the glacial acetic acid, the equivalent quantity of concentrated hydrochloric acid is used for neutralization and if the reaction mixture is worked up in the same manner there is obtained the corresponding chloride, the aqueous solution of which shows a pH value of 2.5, and the solubility properties of which are similar to those of the acetate.

If instead of the glyoxal, the equivalent quantity of glutaraldehyde is used, and if the process is carried out in the same manner, glutaryl-bis-(tri-hydroxymethyl-phosphonium)-hydroxide, -acetate or -chloride is obtained. These compounds resemble the corresponding glyoxal derivatives, as regards their properties.

Example 21

124 grams of tri-hydroxymethyl-phosphine (1 mol) are dissolved with exclusion of air in 124 grams of water at a temperature of about 20° C., and in this solution are introduced through a frit 44 grams of ethyleneoxide. A complete absorption takes place. The formation of the quaternary phosphonium base proceeds with development of heat, and it is, therefore, useful to cool; the pH value of the solution is increased to 11. After concentration of the clear reaction solution by evaporation under reduced pressure, there is obtained in very good yield a colorless oil which is easily soluble in low molecular weight aliphatic alcohols and insoluble in ethers and hydrocarbons, and which solidifies wax-like at low temperatures, and shows the analytical structure of tri-hydroxymethyl-oxethyl-phosphonium-hydroxide. If 1 mol of hydrochloric acid or 1 mol of acetic acid is added, while cooling, to the reaction solution before concentration by evaporation, there is obtained in very good yield and in analytical pureness tri-hydroxymethyl-oxethyl-phosphonium-chloride or -acetate. Both compounds are oils which are easily soluble in water (pH 4 or 6) and methanol, but insoluble in ether and hydrocarbons. It is also possible to prepare these salts by adding slowly and by portions, during introduction of the ethyleneoxide, 1 mol of acid, so that the forming quaternary base is continuously neutralized.

Tri-hydroxymethyl-oxethyl-phosphonium-hydroxide forms a yellow picrolonate (melting point 121° C.) which is recrystallizable from iso-propanol.

Example 22

62 grams of tri-hydroxymethyl-phosphine (0.5 mol) are melted down under exclusion of air, at a temperature of about 55° C., and in this melt are introduced by means of a frit, while stirring, 22 grams (0.5 mol) of ethylene oxide. A complete absorption takes place. The developing heat is carried off by cooling. There is obtained a phosphorus compound which remains oily even at normal temperatures and is easily soluble in water (pH=11) and methanol, but insoluble in ether and hydrocarbons. If this compound is reacted in a methanolic solution with 0.5 mol of glacial acetic acid, preferably while cooling, there is obtained after concentration by evaporation, the tri-hydroxymethyl-oxethyl-phosphonium-acetate likewise described in Example 21. The compound can be furthermore prepared by continuous addition of glacial acetic acid to the melt of tri-hydroxymethyl-phosphine during the introduction of the ethylene oxide.

Example 23

41.3 grams (0.33 mol) of tri-hydroxymethyl-phosphine are dissolved with exclusion of air at a temperature of 20° C. in 50 cc. of water, and to this solution are added dropwise, while stirring, 25 grams (0.33 mol) of glycide. The forming quaternary phosphonium base is simultaneously neutralized with semi-concentrated hydrochloric acid. The temperature is maintained at a range between 20–30° C. by cooling. The aqueous solution is finally concentrated by evaporation under reduced pressure at a temperature of 50° C. There are obtained 77 grams of tri-hydroxymethyl-propylene-glycol-(-1,2)-phosphonium-chloride in form of a colorless viscous oil which is soluble in water (pH value of the aqueous solution=4), methanol and ethanol, but insoluble in ether.

If, instead of hydrochloric acid the equivalent quantity of glacial acetic acid is used for neutralization, the corresponding phosphonium-acetate (85 grams) is obtained in form of a glass-clear viscous oil, which is soluble in low molecular weight alcohols and in water (pH value of the aqueous solution=6.5). It is insoluble in ether.

Example 24

8.91 grams (0.03 mol) of triglycide-cyanurate are suspended in water, and a solution of 11.2 grams of tri-hydroxymethyl-phosphine (0.09 mol) in 20 cc. of water is added dropwise with exclusion of air and while cooling. The triglycide dissolves while developing heat and forms the quaternary tribase (pH-value of the aqueous solution=9.5). By dropwise addition of the calculated quantity of aqueous hydrochloric acid there is obtained, after concentration by evaporation under reduced pressure at 40° C., the tri-chloride of the base in form of a glassy mass, which is soluble in water (pH value of the aqueous solution=4.5). The tri-chloride is soluble in methanol and ethanol, but insoluble in ether.

Example 25

To a solution of 24.8 grams of tri-hydroxymethyl-phosphine (0.2 mol) in 15 ml. of water there are added within about 1 hour with exclusion of oxygen, 18.4 grams of epichlorhydrin (0.2 mol). Simultaneously there is added such a quantity of hydrochloric acid of 20% strength, that the pH value amounts to 7–8 during the addition of the epichlorhydrin. The temperature is maintained between 25–30° C. by cooling. After the reaction has subsided, the rest of the theoretical quantity of hydrochloric acid (in the whole 36.5 grams of hydrochloric acid of 20% strength=0.2 mol) is added. The clear, colorless solution is concentrated in the vacuum at room temperature. There remain 50 grams of a viscous, colorless oil which is very well soluble in water (pH value of the aqueous solution=3), low molecular weight alcohols and dimethylformamide, but is insoluble in ether, acetone, chloroform and hydrocarbons.

Example 26

124 grams of tri-hydroxymethyl-phosphine (1 mol) are dissolved in 60 grams of glacial acetic acid (1 mol) with exclusion of air, and into this solution there are introduced by means of a frit at about 20° C., while stirring, 44 grams of ethylene oxide (1 mol). The ethylene oxide is linked with strong evolution of heat and it is therefore necessary, to cool vigorously. After working up, there is obtained in theoretical yield the tri-hydroxymethyl-oxethyl-phosphonium-acetate in the form of a colorless, viscous oil. It is stirred for sometime in a vacuum (10 mm. Hg) at a temperature of 50° C., whereby altogether 2 grams of easily voltatile by-products are removed. The reaction-product is easily soluble in water (pH value of the aqeous solution=5.8) as well as in methanol and iso-propanol, but it is insoluble in ether and acetic ester, and fully corresponds to the acetates obtained according to Examples 21 and 22.

Example 27

To a solution of 25 grams (0.2 mol) of tri-hydroxymethyl-phosphine in 180 grams of water there are added dropwise within 1 hour with exclusion of air and while stirring, 28 grams of a poly-epoxide compound, prepared from glycerine and epichlorhydrin according to the process of the U.S. specification 2,774,691 and containing 7 epoxide groups per 1,000 grams. The reaction takes place with evolution of heat which is reduced to about 30° C. by external cooling; the pH value of the clear reaction solution rises from 6.5 to about 10.7. 12 grams of glacial acetic acid (0.2 mol) are then added, while cooling, causing the pH value to fall to about 5.0. The clear solution of the poly-phosphonium-acetate is concentrated by evaporation under reduced pressure, whereby 55 grams of a viscous oil are obtained, which is well soluble in methanol, but sparingly soluble in ethanol and isopropanol and insoluble in ether.

Example 28

To a solution of 12.4 grams (0.1 mol) of tri-hydroxymethyl-phosphine in 20 cc. of water there are added slowly and dropwise, while stirring and in an atmosphere of nitrogen, 4.3 grams (0.05 mol) of butadiene-dioxide. The reaction-temperature is maintained below 50° C. by cooling (low evolution of formaldehyde). The base that has formed (pH value of the aqueous solution=10.5) is neutralized at 10–20° C. with 6 grams (0.1 mol) of glacial acetic acid and concentrated by evaporating at 40° C./2 mm. The di-acetate of the bi-phosphonium compound remains in a form of a colorless water-soluble oil, and is obtained in a yield of 97%. The pH value of the aqueous solution of the diacetate is 5.8.

If hydrochloric acid instead of glacial acetic acid is used for the neutralization, the corresponding di-chloride, which has similar solubility properties, is obtained.

*Example 29*

To 248 grams of tri-hydroxymethyl-phosphine are added at a temperature of about 40–50° C., while stirring, 92 grams of epichlorhydrin while operating with exclusion of oxygen in an atmosphere of nitrogen.

The forming reaction heat is carried off by cooling from outside. After about 30 minutes, the reaction mixture is heated to about 75–80° C., and again stirred for a further 4 hours. There are obtained 340 grams of a clear, thickish oily phosphonium compound which is easily soluble in water (pH value of the aqueous solution=8) and methanol, but insoluble in ether.

Instead of the mentioned quantity of epichlorhydrin, there can be used with the same success the equivalent quantity of epibromohydrin.

The products obtained are very suitable for rendering textile materials flame-proof if applied with the usual additives, especially resin forming agents as, for example, aminoplast formers.

*Example 30*

To a solution of 248 grams of tri-hydroxymethyl-phosphine in 250 grams of water there are introduced at approximately 10 to 12° C., 88 grams of ethylene-oxide, and dropwise added 120 grams of glacial acetic acid, an intensive mixing being provided for by stirring. The velocity of the dropping in is so proportioned that the pH value of the reaction mixture is maintained at about 7; the reaction heat developed during the formation of the tri-hydroxymethyl-oxethyl-phosphonium-acetate is carried off by external cooling.

Instead of the glacial acetic acid there may also be used the equivalent quantity of formic acid or hydrochloric acid or carbonic acid. The quantity of water can also be reduced to 50 grams. The reaction can even be performed in such a manner that the acids are added only when one portion of the total quantity of ethylene oxide is introduced. Instead of ethylene oxide there can also be used the equivalent quantity of propylene oxide.

The products obtained are very suitable for rendering textiles flame-proof, if applied with the usual additives, especially resin forming agents, such as aminoplast formers.

*Example 31*

10 grams (0.14 mol) of pure acrylic acid are added within about 15 minutes with exclusion of oxygen, while stirring, to 13 grams of tri-hydroxymethyl-phosphine (0.1 mol). The tri-hydroxymethyl-phosphine dissolves with development of heat, and a homogeneous melt is formed; during this reaction the temperature is maintained at 30–40° C. by cooling. After 30 minutes the reaction is completed. 100 ml. of absolute ethanol are added to the oil, the whole is shaken and allowed to stand until crystallization sets in—which requires several hours. The colorless crystals of analytically pure β-(tri-hydroxymethyl-phosphine)-propionic acid-betaine (melting point 147–148° C.) obtained in good yield are very easily soluble in water, but sparingly soluble in organic solvents. The aqueous solution shows a pH value of 6.

*Example 32*

To a solution of 25 grams of tri-hydroxymethyl-phosphine (0.2 mol) in 150 ml. of ethanol there are added within 30 minutes with exclusion of oxygen, 20 grams of pure acrylic acid (0.28 mol). The betaine is obtained in good yield at first in form of an oil, which already crystallizes during the dropping-in of acrylic acid. During the reaction the temperature is maintained at approx. 30° C. by cooling. The crystals, with a melting point of 148–149° C., are filtered off with suction, washed with ethanol and dried.

*Example 33*

To a mixture of 12.4 grams of tri-hydroxymethyl-phosphine (0.1 mol) and 6 grams of glacial acetic acid there are added within 15 minutes, with exclusion of air, 7.1 grams of acrylamide in small portions (0.1 mol). A viscous, colorless oil is formed in exothermic reaction. During the reaction, which subsides after about 30 minutes, the temperature is maintained below 30° C. For purification the oil is dissolved in alcohol or dimethylformamide, slight insoluble parts are filtered off, and the compound is precipitated by means of acetone or ether. The oil is well soluble in water—pH value of the aqueous solution=6—in low molecular weight alcohols and dimethylformamide, but it is insoluble in ether, acetone, acetic ester and hydrocarbons.

*Example 34*

A solution of 24.8 grams of tri-hydroxymethyl-phosphine (0.2 mol) and 17.2 grams of crotonic acid (0.2 mol) in 100 ml. of anhydrous ethanol is heated to 40° C. with exclusion of oxygen, and the bath is subsequently removed. The temperature remains for 1 hour approximately at a range of 40–50° C. and then slowly decreases whereas the condensation product is separated in form of an oil. During the reaction the pH value rises from 3 to 6. After standing over night the solvent is decanted off and the residue is washed twice with 50 ml. of absolute ethanol and dried in a vacuum. The yield is very good (85% of the theoretical yield). For purification the oil can be dissolved in a little of hot methanol; ethanol is added in the boiling heat until turbidity sets in. On cooling the bentaine again precipitates. The compound is easily soluble in water (pH value of the aqueous solution=6) and in methanol—especially in the heat—but sparingly soluble in ethanol, ether, acetone, acetic ester and hydrocarbons.

*Example 35*

To a solution of 38 grams (0.3 mol) of tri-hydroxymethylphosphine in 150 cc. of 2 N-hydrochloric acid (0.3 mol) there are added in several portions within 2 hours at a temperature of 0° to 10° C., while stirring vigorously, 24.9 grams (0.1 mol) of tri-acrylformal, prepared from acrylonitrile and formaldehyde according to the process described in German patent specification 859,170. A small quantity of the solid by-product, in case such has been formed, is separated, and the aqueous solution concentrated under reduced pressure at 40° C. 65 grams of the tri-chloride of the tri-phosphonium compound are isolated in form of a colorless, water-soluble oil, the aqueous solution of which shows a pH value of 1.5.

The reaction can also be carried out in such a manner that the reaction of the components is effected without addition of acid. In that case, the pH value of the solution amounts to 10.5.

The tri-chloride can be recovered after completed reaction by subsequent neutralization of the tribase with hydrochloric acid.

If the neutralization of the tribase is omitted, the base, which is insoluble in the usual organic solvents, can be isolated in the form of oil by careful dehydration.

Example 36

Into a solution of 12.4 grams of tri-hydroxymethyl-phosphine (0.1 mol) in 30 ml. of absolute ethanol there is introduced within about 30 minutes, in an atmosphere of nitrogen a solution of 11.6 grams of maleic acid (0.1 mol) in 50 ml. of ethanol. With heating from 20° to 40° C., the quaternization product is obtained in a very good yield (75% of the theory) in form of a solorless soft resin at the end of the addition of maleic acid. For purification the substance is dissolved in 10 ml. of water, precipitated with ethanol and dried at room temperature over phosphorus (V) oxide in a vacuum exsiccator. The compound binds 1 mole of KOH approximately and contains 1 mol of $H_2O$.

The compound is very easily soluble in water (pH value of the aqueous solution=3.2), but is sparingly soluble in organic solvents, such as ethanol, acetone, acetic ester, dioxane, benzene, ether and chloroform.

The reaction of tri-hydroxymethyl-phosphine and maleic acid in alcohol is performed analogously to the reaction of maleic acid and pyridine described by Lutz (Ber. 43, 2638/1910). According thereto, a betaine and not an acid phosphonium salt is formed as is shown by a comparison with the reaction of oxalic acid and tri-hydroxymethyl-phosphine.

If a solution of 12.6 grams of oxalic acid in 50 ml. of ethanol is added, with exclusion of air, to a solution of 12.4 grams of tri-hydroxymethyl-phosphine (0.1 mol) in 30 ml. of absolute ethanol, no heat effect can be observed, although the oxalic acid is a stronger acid than the maleic acid.

Dissociation constants: oxalic acid $pKa_1=1.46$; $pKa_2=4.40$; maleic acid $pKa_1=1.9$; $pKa_2=6.5$ (Fieser, Lehrbuch der organischen Chemie, 1954, Weinheim, pages 300 and 325). If the heat effect developed during reaction of maleic acid with tri-hydroxymethyl-phosphine were a neutralization heat, it would have to be much greater in the reaction of oxalic acid with tri-hydroxymethyl-phosphine. The alcoholic solution of oxalic acid consumes, per 1 mol of oxalic acid, 2 mols of caustic potash solution in the presence of tri-hydroxy-methyl-phosphine, whereas the maleic acid betaine—as mentioned above—needs only 1 mol of potash lye. After distilling off the solvent in the vacuum, there remains a hygroscopic, acid oxalate which is immediately hydrolyzed by water. In contradistinction to maleic acid betaine, the free oxalic acid can be extracted from the aqueous solution by means of ether.

Example 37

To a solution of 25 grams (⅕ mol) of tri-hydroxymethyl-phosphine in 10 grams of water there are added dropwise, with exclusion of oxygen, while stirring, 34 grams (⅕ mol) of maleic acid diethyl-ester, the reaction heat being eliminated at 30° C. by external cooling. The milky emulsion is still stirred for 1 hour at 70° C. whereby a clear solution is formed which, however, on cooling separates into 2 layers. The thin upper layer, which is poor in phosphorus, is separated and the lower layer, consisting of oil is freed from small quantities of unreacted maleic ester by shaking with ether. The oily phosphorus compound insoluble in ether, thus obtained is freed in the vacuum from ether residues; it is easily soluble in water, while showing a neutral reaction, as well as in methanol and ethanol.

If the equivalent quantity of methyl- or butyl-ester instead of di-ethyl-ester is used, similar oily phosphorus compounds are obtained.

Example 38

124 grams of tri-hydroxymethyl-phosphine are dissolved in 50 ml. of water, with exclusion of air and at a temperature of about 50° C., and into this solution there are introduced dropwise, while stirring, 46 grams of epichlorhydrin. The temperature of the reaction mixture is maintained at about 50–55° C. by cooling from outside. After the addition of epichlorhydrin, the reaction mixture is heated for a further 3 hours to 60–70° C., and the methanol is distilled off in the vacuum. The residue obtained constitutes an oily phosphonium compound in which the total chlorine is present in ionogenic form. The compound is very convenient for rendering textile materials flame-proof, in combination with the usual additives, and its properties correspond to those of the reaction products obtained according to Examples 3 and 10.

We claim:
1. A process for preparing quaternary organic phosphorus compounds containing three hydroxymethyl groups bound to phosphorus which comprises reacting tri-hydroxymethyl phosphine with a quaternizing agent of the group consisting of

(a) Alkyl halides containing up to 12 carbon atoms and up to two halogen atoms one of which is bound to a terminal carbon atom
(b) Lower aralkyl halides having a halogen atom on the terminal carbon atom of the side chain
(c) Lower alkylene halohydrins
(d) Dihalo lower alkyl ethers having a halogen atom on each of two terminal carbon atoms
(e) Lower halo olefines having a halogen atom on a terminal carbon atom
(f) Lower alkyl esters of p-toluene sulfonic acid
(g) Lower dialkyl sulfates
(h) Chloracetamide
(i) Lower aliphatic dialdehydes containing two to five carbon atoms
(j) Triacryformal
(k) Triglycidcyanurate
(l) Saturated lower aliphatic epoxy compounds having up to two epoxy rings and two to four carbon atoms
(m) Polyepoxides prepared from glycerine and epichorhydrin and containing up to 7 epoxy groups per kilogram
(n) Acrylic acid
(o) Acrylamide
(p) Beta-bromethane phosphoric acid diethylester
(q) Tri-chloromethyl phosphine oxide
(r) Tetra-chloromethyl phosphonium chloride.

2. A process as in claim 1 in which said quaternizing agent is a lower aliphatic dialdehyde containing two to five carbon atoms, and the reaction with tri-hydroxymethyl phosphine proceeds in the presence of an acid.

3. A process as in claim 1 in which said quaternizing agent is a saturated lower aliphatic epoxy compound having up to two epoxy rings and two to four carbon atoms, and the reaction with tri-hydroxymethyl phosphine proceeds in the presence of an acid.

4. An organic quaternary phosphorus compound consisting essentially of the reaction product of tri-hydroxymethyl phosphine with a quaternizing agent of the group consisting of (a) Alkyl halides containing up to 12 carbon atoms and up to two halogen atoms one of which is bound to a terminal carbon atom
(b) Lower aralkyl halides having a halogen atom on the terminal carbon atom of the side chain
(c) Lower alkylene halohydrins
(d) Dihalo lower alkyl ethers having a halogen atom on each of two terminal carbon atoms
(e) Lower halo olefines having a halogen atom on a terminal carbon atom
(f) Lower alkyl esters of p-toluene sulfonic acid
(g) Lower dialkyl sulfates
(h) Chloracetamide
(i) Lower aliphatic dialdehydes containing two to five carbon atoms
(j) Triacrylformal
(k) Triglycidcyanurate (l) Saturated lower aliphatic epoxy compounds having up to two epoxy rings and two to four carbon atoms
(m) Polyepoxides prepared from glycerine and epichlorhydrin and containing up to 7 epoxy groups per kilogram
(n) Acrylic acid
(o) Acrylamide
(p) Beta-bromethane phosphoric acid diethylester
(q) Tri-chloromethyl phosphine oxide
(r) Tetra-chloromethyl phosphonium chloride.

References Cited in the file of this patent

UNITED STATES PATENTS

| | | |
|---|---|---|
| 2,271,622 | Carroll et al. | Feb. 3, 1942 |
| 2,703,814 | Dye | Mar. 8, 1955 |
| 2,814,573 | Reeves et al. | Nov. 26, 1957 |

OTHER REFERENCES

Kosolapoff, "Organophosphorus Compounds," John Wiley & Sons, Inc., New York (1950), pages 23 to 29 and 78.